United States Patent
Picard

(10) Patent No.: US 12,348,692 B2
(45) Date of Patent: Jul. 1, 2025

(54) OPTIMIZING A COPY DETECTION PATTERN TO INCREASE COPY DETECTING PERFORMANCE

(71) Applicant: SCANTRUST B.V., Amsterdam (NL)

(72) Inventor: Justin Picard, St Sulpice (CH)

(73) Assignee: SCANTRUST B.V., Amsterdam (NL)

( * ) Notice: Subject to any disclaimer, the term of this patent is extended or adjusted under 35 U.S.C. 154(b) by 0 days.

(21) Appl. No.: 18/286,776

(22) PCT Filed: Apr. 13, 2022

(86) PCT No.: PCT/EP2022/059889
§ 371 (c)(1),
(2) Date: Oct. 13, 2023

(87) PCT Pub. No.: WO2022/219049
PCT Pub. Date: Oct. 20, 2022

(65) Prior Publication Data
US 2024/0205349 A1 Jun. 20, 2024

(30) Foreign Application Priority Data
Apr. 15, 2021 (EP) .................................... 21168730

(51) Int. Cl.
*H04N 1/32* (2006.01)
*G06K 7/14* (2006.01)
(Continued)

(52) U.S. Cl.
CPC ....... *H04N 1/32219* (2013.01); *G06K 7/1465* (2013.01); *G06K 7/1482* (2013.01);
(Continued)

(58) Field of Classification Search
CPC . H04N 1/32219; G06K 7/1482; G06K 7/1465
See application file for complete search history.

(56) References Cited

U.S. PATENT DOCUMENTS 7,809,152 B2 10/2010 Zhao et al.
8,593,696 B2 11/2013 Picard et al.
(Continued)

FOREIGN PATENT DOCUMENTS

EP 0 912 042 4/1999
WO WO 2009/004172 1/2009

OTHER PUBLICATIONS

Written Opinion in International Application No. PCT/EP2022/059889, Aug. 1, 2022, pp. 1-9.
Nguyen, H. P. et al. "A Watermarking Technique to Secure Printed Matrix Barcode—Application for Anti-Counterfeit Packaging" *IEEE Access*, Aug. 26, 2019, pp. 131839-131850, vol. 7.
(Continued)

*Primary Examiner* — Peter K Huntsinger
(74) *Attorney, Agent, or Firm* — SALIWANCHIK, LLOYD & EISENSCHENK

(57) ABSTRACT

Method of generating a copy detection pattern (CDP), or a portion of a CDP, for printing on a substrate, comprising: generating a plurality of digital files, each of an image comprising an at least partially random two dimensional (2D) distribution of dark and light pixels, and applying an optimization process configured to increase a copy detection performance of a resultant digital file output by the method, said optimization process comprising a) comparing a copy detection performance of a first of said plurality of digital files, which constitutes a test digital file, with a copy detection performance of another of said plurality of digital files modified with respect to said test digital file, which constitutes a modified digital file, b) replacing the test digital file with said modified digital file, if the copy detection performance of said modified digital file is greater than the copy detection performance of the test digital file, in which case the modified digital file becomes the test digital file, and c) repeating steps a) and b) until a termination condition is met.

27 Claims, 17 Drawing Sheets

(51) Int. Cl.
*G06K 19/06* (2006.01)
*H04N 1/00* (2006.01)

(52) U.S. Cl.
CPC ... *G06K 19/06037* (2013.01); *H04N 1/00883* (2013.01); *H04N 1/32352* (2013.01); *H04N 2201/3271* (2013.01)

(56) References Cited

U.S. PATENT DOCUMENTS

| | | | | |
|---|---|---|---|---|
| 2007/0076239 | A1* | 4/2007 | Haas | H04N 1/00002 358/1.14 |
| 2007/0076948 | A1 | 4/2007 | Haas et al. | |
| 2008/0158588 | A1* | 7/2008 | Haas | G07B 17/00508 358/1.15 |
| 2010/0220364 | A1 | 9/2010 | Picard et al. | |
| 2010/0230493 | A1* | 9/2010 | Akiyama | G06K 7/14 235/437 |
| 2019/0332840 | A1* | 10/2019 | Sharma | G06K 7/1443 |

OTHER PUBLICATIONS

Yadav, R. et al. "Copy Sensitive Graphical Code Estimation: Physical vs Numerical Resolution" *IEEE International Workshop on Information Forensics and Security*, Dec. 9, 2019, pp. 1-6.

Picard, J. "Digital authentication with copy-detection patterns" *Proc. SPIE 5310, Optical Security and Counterfeit Deterrence Techniques V*, Jun. 3, 2004, pp. 1-3, vol. 5310, abstract only, https://doi.org/10.1117/12.528055.

Picard, J. "On the Security of Copy Detectable Images" *NIP & Digital Fabrication Conference*, Sep. 2008, pp. 1-3.

Picard, J. "Copy Detectable Images: From Theory to Practice" Conference Paper: Optical Document Security, Jan. 2008, pp. 1-11.

ANONYMOUS "Gaussian blur" Wikipedia, retrieved from internet on Sep. 20, 2023, https://en.wikipedia.org/wiki/Gaussian_blur, undated, pp. 1-6.

Taran, O. et al. "Adversarial Detection of Counterfeited Printable Graphical Codes: Towards "Adversarial Games" in Physical World" *Conference Paper*, May 2020, pp. 1-6.

* cited by examiner

Figure 1
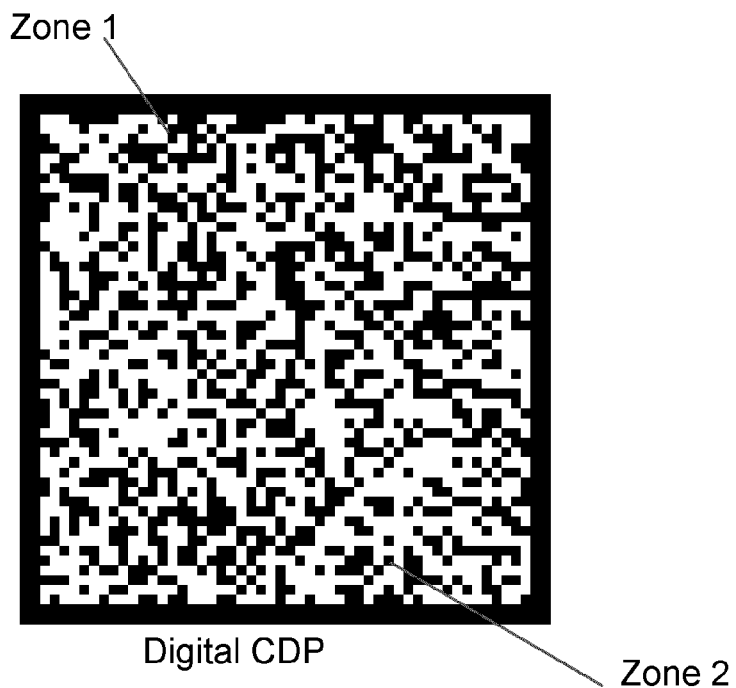
Digital CDP
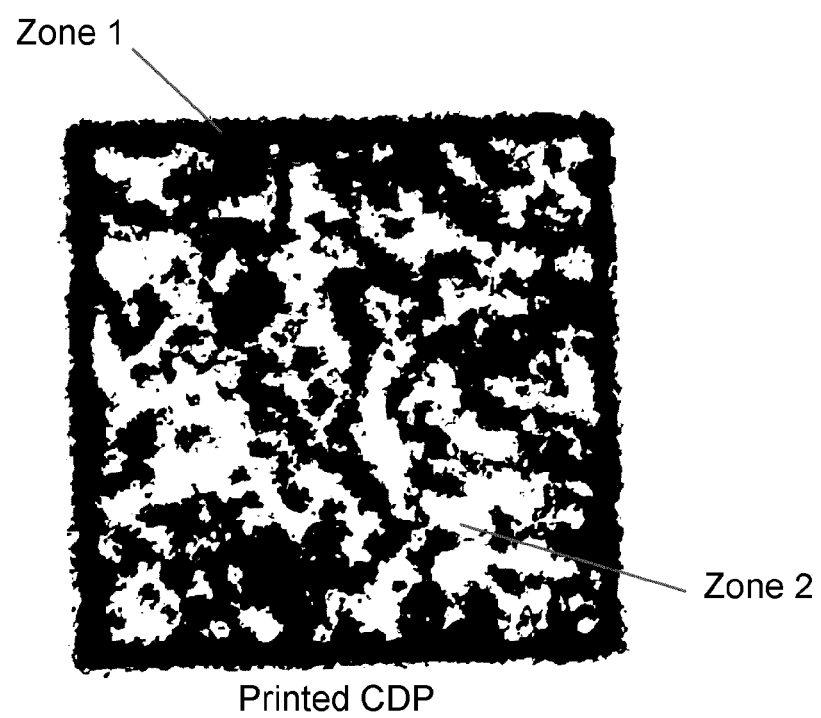
Printed CDP

Figure 2
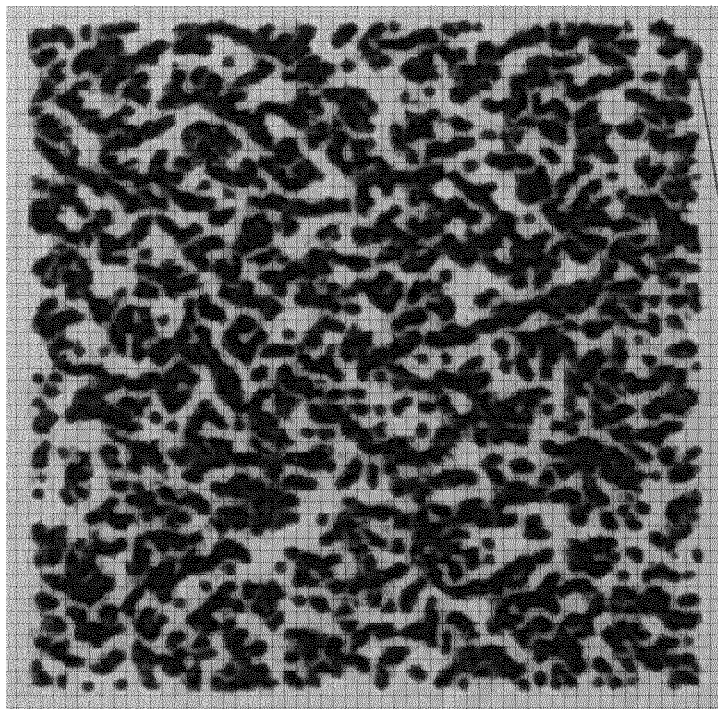
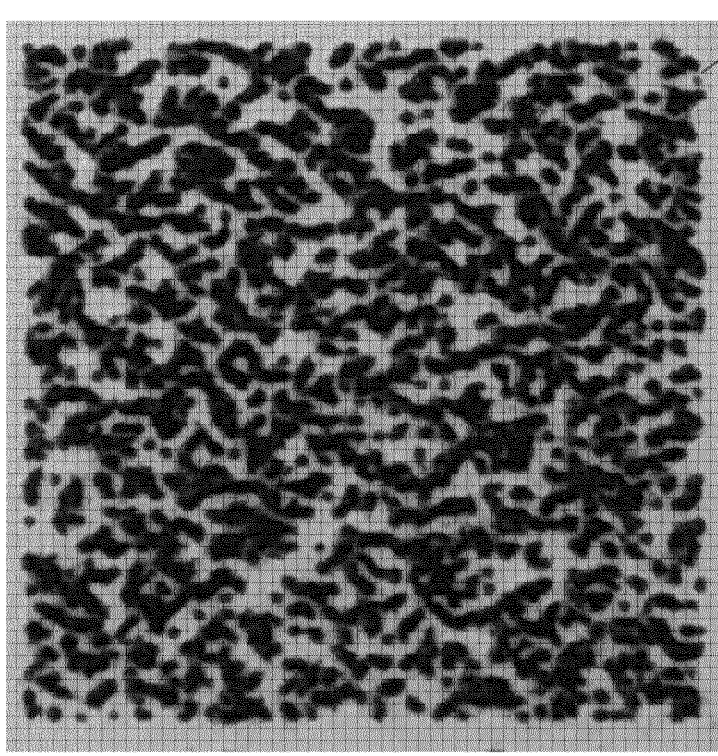
difference

Figure 3
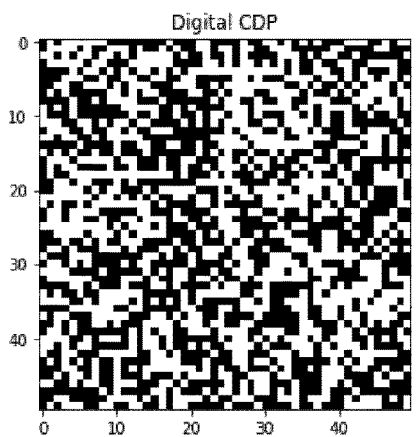
(a)
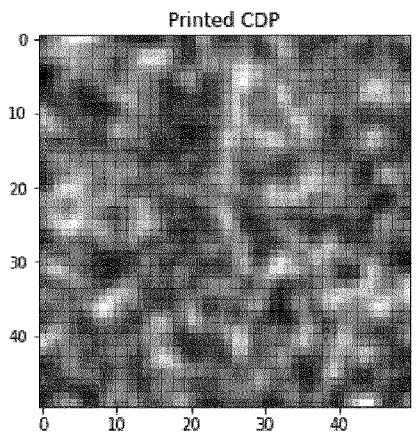
(b)
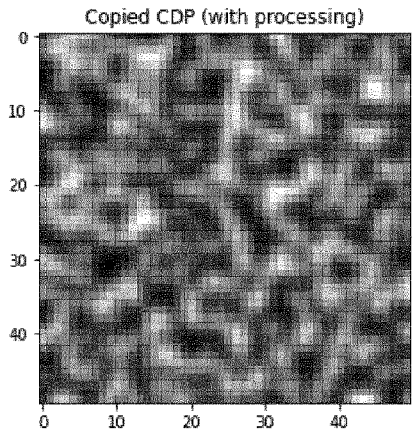
(c)
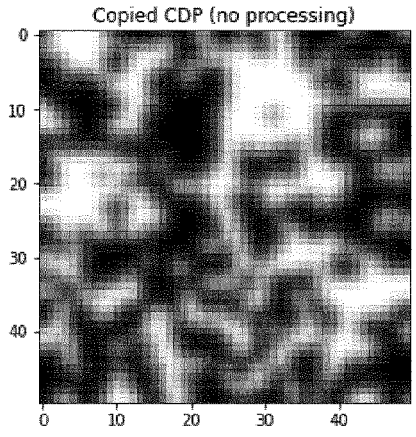
(d)

Figure 4

```python
def measure_score_binary_imgs(img1, img0):
    return 1 - 2 * np.mean(np.abs(img1 - img0))

def measure_score(img1, img0):
    return np.corrcoef(np.ravel(img1), np.ravel(img0))[0, 1]

#Result of printing is not binarized
#Counterfeiter uses unsharp mask then binarization
def channel_1(img, sigma_print):
    img1 = simul_print(img, sigma_print)
    img2 = unsharp_mask(img1, radius=.543, amount=4)
    img2 = (img2 > np.mean(img2)).astype(np.float)
    img3 = simul_print(img2, sigma_print)
    return [img1, img3]
#Result of printing is   binarized
No processing by counterfeiter def channel_2(img, sigma_print):
    img1 = simul_print_thr(img, sigma_print, 0.5)
    img2 = img1
    img3 = simul_print_thr(img2, sigma_print, 0.5)
    return [img1, img3]
#Result of printing is   binarized
Counterfeiter uses unsharp mask then binarization def channel_3(img, sigma_print):
    img1 = simul_print_thr(img, sigma_print, 0.5)
    img2 = unsharp_mask(img1, radius=1, amount=3)
    img2 = (img2 > np.mean(img2)).astype(np.float)
    img3 = simul_print_thr(img2, sigma_print, 0.5)
    return [img1, img3]

#Result of printing is   grayscale
#binary thresholding  processing by counterfeiter
def channel_4(img, sigma_print):
    img1 = simul_print(img, sigma_print)
    img2 = unsharp_mask(img1, radius=1, amount=3)
    img2 = (img2 > np.mean(img2)).astype(np.float)
    img3 = simul_print(img2, sigma_print)
    return [img1, img3]

#Result of printing is   grascale
#binary thresholding  processing by counterfeiter
#blurry scan
def channel_5(img, sigma_print, sigma_scan):
    img1 = simul_print(img, sigma_print)
    #img2=img1
    img2 = unsharp_mask(img1, radius=1, amount=3)
    img2 = (img2 > np.mean(img2)).astype(np.float)
    img3 = simul_print(img2, sigma_print)
    img1 = gaussian_filter(img1, sigma_scan)
    img3 = gaussian_filter(img3, sigma_scan)
    return [img1, img3]
```

Figure 4 continued

```python
import numpy as np
import matplotlib.pyplot as plt
from scipy.ndimage import gaussian_filter
from skimage.feature import match_template
from skimage.filters import unsharp_mask def generate_sg(p, size, seed=0):
    if seed != 0:
        np.random.seed(seed=seed)
    img = (np.random.rand(size, size) > p).astype(float)
    return img def simul_print(img, sigma):
    img1 = gaussian_filter(img, sigma)
    return img1 def simul_print_thr(img, sigma, thr=-1):
    img1 = gaussian_filter(img, sigma)
    if (thr > 0):
        img1 = (img1 > thr).astype(float)
    return img1 def unsharp(img, sigma, ammount):
    img1 = gaussian_filter(img.astype(float), sigma)
    img2 = img + (img - img1) * ammount
    #img2=img2-np.min(img2)
    #img2=img/np.max(img2)
    #img2=np.maximum(img2,0)
    #img2=np.minimum(img2,1)
    return img2
```

Figure 4a

```python
def find_optimal_sg():
    N = 50
    d = 0.5
    sigma_scan = 0.8
    thr_print = -1
    img_init = generate_sg(d, N,seed=110)  #dig
    sigma_print = 1
    img = img_init
    p0 = 0.005
    r = []
    channel = channel_1
    nb_iterations = 5000
    for i in range(0, nb_iterations):
        p = p0 * (1 - i / nb_iterations)
        p = p0
        img1, img3 = channel(img, sigma_print)
        if i == 0:
            print(img1.dtype, img.dtype, img1.shape, img.shape)
            print("Score original (first iteration)", measure_score(img1, img))
            print("Score copy (first iteration)", measure_score(img3, img))
        score1 = measure_score(img1, img) - measure_score(img3, img)
        mask = np.random.rand(N, N) > (1 - p)
        img_t = np.logical_xor(img.astype(np.bool), mask).astype(float)
        img1, img3 = channel(img_t, sigma_print)#, sigma_scan)
        score2 = measure_score(img1, img_t) - measure_score(img3, img_t)
        #print(i,p,score1,score2)
        if score2 > score1:
            img = img_t
        r.append(score1)

plt.plot(r)
    plt.xlabel('Number of iterations')
    plt.ylabel('Score difference between original and copy')
    plt.show()
    print("Score original (final iteration)", measure_score(img1, img_t))
    print("Score copy (final iteration)", measure_score(img3, img_t))
    print("Final score difference: ", score1)
    return img, img_init img_opt, img_init = find_optimal_sg()

print("Avg density (init): ", np.mean(img_init))
print("Avg density (final):", np.mean(img_opt))
plt.imshow(img_init)
plt.title("Initial secure graphic")
plt.show()
plt.imshow(img_opt)
plt.title("optimized secure graphic")
plt.show()
```

Figure 4b

```
vals=np.zeros([1000,3])
for i in range(0,1000):
    sigma_print = 1
    cdp_dig= generate_sg(0.5, 50)
    cdp_orig = simul_print(cdp_dig, sigma_print)

tmp = (cdp_orig > np.mean(cdp_orig)).astype(float)
    cdp_copy_bad = simul_print(tmp, sigma_print)

tmp1 = unsharp_mask(cdp_orig, radius=0.543, amount=43)
    tmp1 = (tmp1 > np.mean(tmp1)).astype(float)
    cdp_copy_good = simul_print(tmp1, sigma_print)

score_orig=measure_score(cdp_orig, cdp_dig)
    score_copy_bad=measure_score(cdp_copy_bad, cdp_dig)
    score_copy_good=measure_score(cdp_copy_good, cdp_dig)
    vals[i,:]=[score_orig,score_copy_bad,score_copy_good]

x=vals[:,0]-vals[:,2]
print(min(x), max(x))
```

```
sigma_print = 1
thr_print = 0.5
min_score = 100
min_rad = 0
min_am = 0
min_imgs = []
radius = np.linspace(0.2, 3, 50)
ammount = np.linspace(0.5, 100, 50)

for rad in radius:
    for am in ammount:
        img0 = generate_sg(0.5, 50,seed=110)
        img1 = simul_print(img0, sigma_print)
        img1_2 = unsharp(img1.astype(np.float), rad, am)
        img2 = (img1_2 > np.mean(img1_2)).astype(float)
        img3 = simul_print(img2, sigma_print)
        #score = np.mean(np.abs(img2 - img1))
        s1=measure_score(img1, img0)
        s2=measure_score(img3, img0)
        score=s1-s2
        #print(rad,am,s1,s2,score)

if score < min_score:
            min_score = score
            min_rad = rad
            min_am = am
            min_imgs = [img1, img2, img3]

print("Lowest difference is %.3f is found for radius=%.3f and ammount=%.3f"%(min_score, min_rad, min_am))
print(min_am,min_rad)
print("Min score:",min_score)
```

Figure 4c

Figure 7
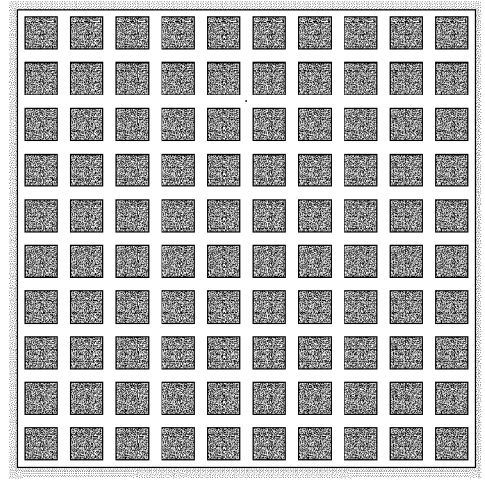
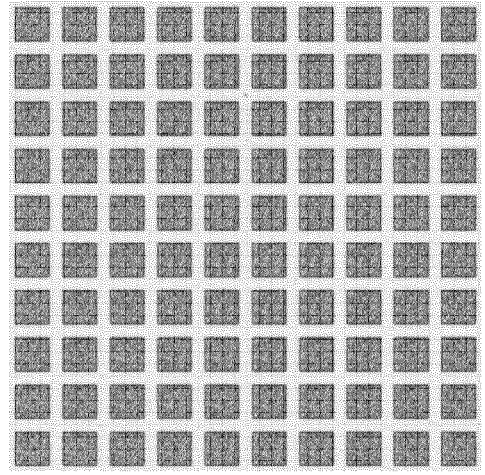
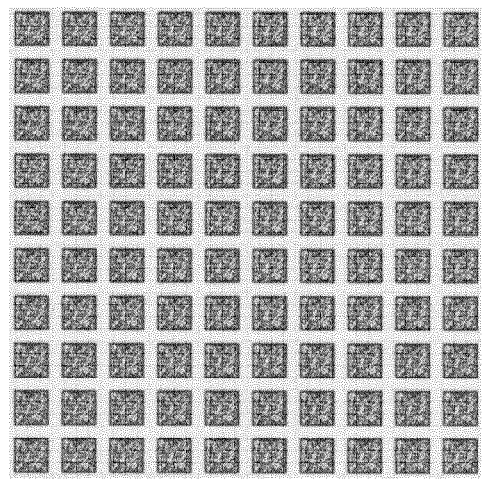

Figure 9

```python
def optimize_sg(img0, nb_iterations):
    cnt01 = 0
    cnt10 = 0
    img = np.copy(img0)
    for i in range(0, nb_iterations):
        x = 1 + np.random.randint(img.shape[1] - 1)
        y = 1 + np.random.randint(img.shape[0] - 1)
        s = np.sum(img[y - 1:y + 2, x - 1:x + 2])
        #print(s,img[y,x])
        if img[y, x] == 0:
            if s <= 5:
                img[y, x] = 1
                cnt01 += 1
        elif img[y, x] == 1:
            if s >= 5:
                img[y, x] = 0
                cnt10 += 1
    #print (cnt01,cnt10)
    return img
```

Figure 10
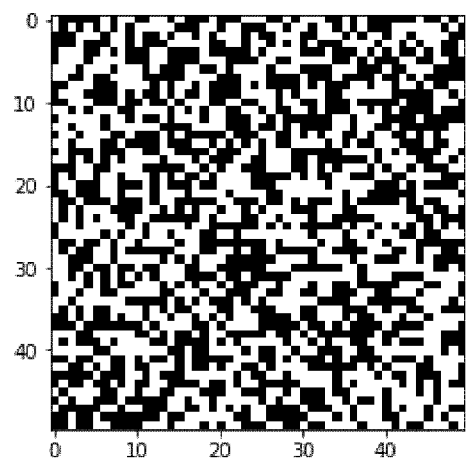
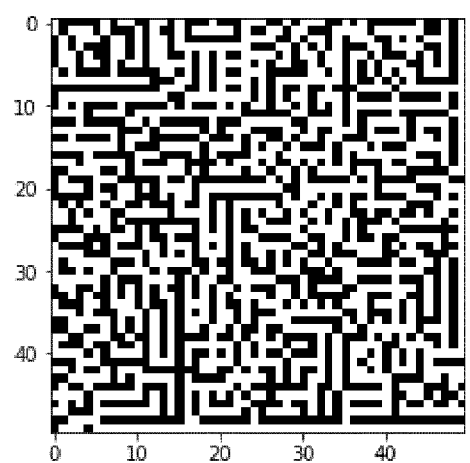

Figure 12

| score | sigma |
|---|---|
| 0.7 | 0.811 |
| 0.69 | 0.823 |
| 0.68 | 0.836 |
| 0.67 | 0.849 |
| 0.66 | 0.863 |
| 0.65 | 0.877 |
| 0.64 | 0.891 |
| 0.63 | 0.906 |
| 0.62 | 0.921 |
| 0.61 | 0.937 |
| 0.6 | 0.953 |
| 0.59 | 0.970 |
| 0.58 | 0.988 |
| 0.57 | 1.005 |
| 0.56 | 1.024 |
| 0.55 | 1.044 |
| 0.54 | 1.064 |
| 0.53 | 1.085 |
| 0.52 | 1.106 |
| 0.51 | 1.129 |
| 0.5 | 1.152 |
| 0.49 | 1.177 |
| 0.48 | 1.203 |
| 0.47 | 1.230 |
| 0.46 | 1.258 |
| 0.45 | 1.287 |
| 0.44 | 1.318 |
| 0.43 | 1.350 |
| 0.42 | 1.384 |
| 0.41 | 1.420 |
| 0.4 | 1.458 |
| 0.39 | 1.497 |
| 0.38 | 1.539 |
| 0.37 | 1.583 |
| 0.36 | 1.630 |
| 0.35 | 1.679 |
| 0.34 | 1.732 |
| 0.33 | 1.787 |
| 0.32 | 1.846 |
| 0.31 | 1.909 |
| 0.3 | 1.975 |
| 0.29 | 2.046 |
| 0.28 | 2.121 |
| 0.27 | 2.202 |
| 0.26 | 2.287 |
| 0.25 | 2.379 |

OPTIMIZING A COPY DETECTION PATTERN TO INCREASE COPY DETECTING PERFORMANCE

CROSS-REFERENCE TO RELATED APPLICATION

This application is the U.S. national stage application of International Patent Application No. PCT/EP2022/059889, filed Apr. 13, 2022.

FIELD OF THE INVENTION

The present invention relates to a copy detection pattern (CDP) for printing on an article or substrate, and a method of generating a CDP.

BACKGROUND

A copy detection pattern (CDP), secure graphic (SG) or graphical code is a small random or pseudo-random digital image which is printed on documents, labels or products for counterfeit detection. Authentication is made by scanning the printed CDP using an image scanner or mobile phone camera.

In World Wide Web spiedigitallibrary.org/conference-proceedings-of-spie/5310/1/Digital-authentication-with-copy-detection-patterns/10.1117/12.528055.short?SSO=1, it is explained that the detection of counterfeits using a CDP relies on an "information loss principle", which states that every time a digital image is printed or scanned, some information is lost about the original digital image. A CDP is defined as a "maximum entropy image" that attempts to take advantage of this information loss, with counterfeits containing less information than original prints on the digital image of the CDP. Indeed, compared to producing an original print of a CDP, producing a counterfeit CDP requires one additional scanning and printing process and will have thus have less accurate information than an original CDP. By measuring the information in the scanned CDP, the detector can determine whether the CDP is an original print or a copy.

CDPs aim to address limitations of optical security features such as security holograms for detecting counterfeits. They are motivated by the need for security features that can be originated, managed and transferred digitally, and that are machine readable. Contrary to many traditional security printing techniques which are not secure anymore once the knowledge and equipment to produce them is disseminated, the algorithm for generating CDPs can be public as long as the key or image used to generate it or the digital CDP is not revealed. If a key is compromised, CDPs generated with other keys by the same algorithm maintain their security.

The CDP can be viewed as an image which is designed with the purpose to be as sensitive as possible to printing and copying, such that it is as difficult as possible to copy successfully by a counterfeiter. However when CDPs were first introduced in 2002 (patents.google.com/patent/US7,809,152B2/en), no method was provided to generate them in a way that would ensure their sensitivity to copy attempts and ability to detect counterfeits would be maximized. The patent only proposed to generate a random image, without consideration for the printer resolution, or whether the image should be grayscale or binary (for example offset printers only print binary images, and use halftoning for grayscale images). Therefore it was not revealed how to generate CDPs that would in effect be optimized for discerning originals from counterfeits.

It was observed later on (World Wide Web researchgate.net/publication/341030510_On_the_Security_of_Copy_Detectable_Images) that as most printers actually print binary images at a single, native resolution, it is preferable to generate CDPs as random or pseudo-random binary images at the native printer resolution. As the maximum entropy of a digital binary image with N pixels is N bits, and is reached if the probability of a black versus a white pixel is 50%. However, the entropy of (or amount of information contained in) the digital CDP is typically significantly reduced by printing the CDP at the native printer resolution, due to the naturally occurring information loss caused by dot gain or ink smearing. It is even possible in some situations, for example If dot gain is too high, that the printed CDP becomes flat grey. In such cases, the entropy can become null after printing, as there is no remaining information from the digital CDP. Of course, such a CDP that has lost all its information after the first print, would lose its capacity to discern original prints from copies. In conclusion, simply maximizing the entropy of the digital image of the CDP is in general not the best way to optimize their capacity to discern original prints from counterfeits.

Attempts have been made to develop theoretical models from which the parameter values that optimize the CDP's ability to differentiate originals from copies can be inferred. The problem can be modeled in a decision-theoretic way, with assumptions on the input signal, the attack channel (how the counterfeit is made), and the print channel. For example in World Wide Web researchgate.net/publication/341030602_Copy_Detectable_Images_From_Theory_to-_Practice, the signal input (CDP) is binary and the print channel output is also binary, with a probability p that a pixel flips during printing and during copying. This probability describes the noise of the print channel. Based on this model, it was found that the detection performance is maximized for a probability of approx. 19.1%. In World Wide Web researchgate.net/publication/341030510_On_the_Security_of_Copy_Detectable_Images and patent application WO2009004172A2, the signal input is also binary and equiprobable, except the print channel is modeled as additive white Gaussian noise described with one parameter representative of the noise level of the print channel. The counterfeiter must take a binary decision on the binary value of each signal element. Assuming that the counterfeiter makes an optimal decision in the sense of choosing the signal values which minimize errors in the copy, it is found that the detection performance is optimal if the SNR is approximately 0.562.

These models provide insight into what makes a CDP sensitive to copy (e.g. a certain amount of noise or information loss in the channel is required) but they are misleading as well. One issue is that to apply the model requires to have a print channel with a level of noise which is ideally close to the optimum. In practice, the producer of documents or packaging does not get to select a printing channel: this channel is in most cases a given, based on the specifications of the printer, ink and paper. But even if such specifications could be controlled, there is no reason that the counterfeiter would have used the same parameters. In particular, if the specifications lead to printing with lower quality than what could be achieved with standard printing operations, then the counterfeiter would simply use a better print quality than was used for the original, and increase his chances to have a successful copy.

The models do not indicate how to model the source signal (generate the digital CDP) to approach this signal to noise ratio or error rate. In fact, it assumes binary equiprobable values (i.e. of black and white pixels). It is proposed in WO2009004172A2 to approach the target SNR by adjusting the cell size (2×2 black pixels, 3×3 black pixels, etc), and use two sizes such that the printing noise will make lead to errors if the counterfeiter tries to determine what dot structure was used.

These models of printing lead to mistaken conclusions on how to design the CDP. First, they assume that printing has the same effect to black (printed) pixels and white (not printed) pixels. In reality, printing is fairly asymmetric, as a black pixel will rarely become white after printing, while due to dot gain and ink smearing a white pixel will much more frequently become black.

Secondly, they assume that the printing channel can be correctly modeled by a noisy channel. In reality, the noise part in printing a CDP is relatively very small, compared to the mostly deterministic effects of dot gain and ink smearing, which can be better modeled by a combination of low-pass filters and eventually, thresholding.

Thirdly, the application of the model to derive more effective generation of CDPs is suboptimal. In U.S. Pat. No. 8,593,696B2, to target an optimal channel noise factor, it is proposed to use cell sizes of printed black pixels, for example 2×2 or 3×3 pixels. Due to the printing variations, there is uncertainty in determining whether a 2×2 or 3×3 cell was printed. It is noted that for lower resolution printing, e.g. 1200 pixels and under, such a method does not work as using cell sizes of more than 1 pixels will lead to negligible information loss, and therefore near perfect copying will be possible.

In most of the prior art, and in much of the research on the field, binary equiprobable signals are used, meaning on average there are 50% black pixels, or 50% of black cells. In U.S. Pat. No. 9,594,993B2, it is proposed to use a density which differs significantly from 50%, for example 40% of black pixels and 60% of white pixels. The underlying objective is to maximize the information density in original prints and thereby to increase the degradation rate when reproduced, i.e. to maximize the information loss during reproduction of original 2D barcode. While this addresses some of the shortcomings mentioned previously, nothing in the method proposed gives proof, or at least confidence, that a CDP that is maximally effective at detecting copying is generated.

Finally, none of the prior art takes into account the impact that the scanning device may have. Indeed, it is possible that a certain CDP with very fine structure may be very effective if an optimal scanning device (for example a microscope) is used. However, the same CDP could be completely ineffective if scanned with a poor quality scanning device, such as a lower cost mobile camera, as the fine structure might be completely erased in the scan (which probably look like flat gray). For such a device, a more coarse structure, which might be able to discern photocopies, could be better suited. However, the prior art does not propose any method for determining such a structure.

Photocopies and even copies made from a high-resolution scan and using the same printer are generally easy to detect with CDPs. The problem we seek to address here is the detection of superior copies, that are made by applying high-pass filters which allow to pre-compensate the dot gain which occurs during printing of the copy. Copied CDPs can get dangerously close to originals, and while there may remain some statistically significant differences between copied CDPs and original CDPs, after taking into account natural printing and scanning variations, it may become difficult to discern originals from copies with very high reliability.

Besides the use of standard image processing (e.g. high-pass filters, binarization), there is an increasing amount of research on the use of machine learning techniques, and in particular deep learning, to make more accurate copies. For example, in R. Yadav, I. Tkachenko, A. Trémeau, and T. Fournel, "*Copy Sensitive Graphical Code Estimation: Physical vs Numerical Resolution,*" in IEEE Workshop on Information Forensics and Security, Delft, Netherlands, December 2019, an efficient estimation attack is developed using an auto-encoder, which is a special type of neural network. While CDPs do not get copied perfectly by such methods, the difference with originals is relatively small, such that it can become problematic to detect such copies in applications where the quality of prints and detection scans varies significantly. The prior art does not provide methods to improve the detection of such sophisticated copies.

SUMMARY OF THE INVENTION

An object of the invention is provide a method of generating a CDP for printing on an article, and a CDP generated thereby, that allows very reliable detection of copy attempts.

It is advantageous to provide, a method of generating a CDP for printing on an article, and a CDP generated thereby, that allows very reliable detection of copy attempts for various printing.

It is advantageous to provide, a method of generating a CDP for printing on an article, and a CDP generated thereby, that allows very reliable detection of copy attempts using various scanning techniques and various scanners.
techniques and various printers.

It is advantageous to provide, a method of generating a CDP for printing on an article, and a CDP generated thereby, that is economical to implement and easy to use.

Objects of the invention have been achieved by providing a method according to claim 1. Dependent claims set forth some of the features of advantageous embodiments.

Disclosed herein is a method of generating a copy detection pattern (CDP), or a portion of a CDP, for printing on a substrate, including:
  generating a plurality of digital files, each of an image comprising an at least partially random two dimensional (2D) distribution of dark and light pixels, and
  applying an optimization process configured to increase a copy detection performance of a resultant digital file output by the method.

The optimization process comprises:
a) comparing a copy detection performance of a first of said plurality of digital files, which constitutes a test digital file, with a copy detection performance of another of said plurality of digital files modified with respect to said test digital file, which constitutes a modified digital file,
b) replacing the test digital file with said modified digital file, if the copy detection performance of said modified digital file is greater than the copy detection performance of the test digital file, in which case the modified digital file becomes the test digital file, and repeating steps a) and b) until a termination condition is met.

The digital file with the highest copy detection performance may be retained as resultant digital file output by the method. This may in particular be the last test or modified digital file on termination of process, if an iterative process is employed.

The step of comparing a copy detection performance includes, for each of said test and modified digital files:
  applying a first print simulation filter configured to generate a first print image file simulating an original print of said image on a substrate,
  applying a second print simulation filter to said first print image file to generate a second print image file simulating a printed copy of said original print, and
  computing a copy detection performance for the digital file indicative of a measure of the differences between the printed copy and the original print.

In an advantageous embodiment, said computing a copy detection performance includes computing a score for each of the first and second print image files representative of a difference between the digital file and each of said first and second print image files.

In an advantageous embodiment, computing the score comprises measuring a Pearson correlation coefficient.

In an advantageous embodiment, the first print simulation filter is a gaussian filter.

In an embodiment, said second print simulation filter is identical to said first print simulation filter.

In another embodiment, said second print simulation filter is different from said first print simulation filter.

In an advantageous embodiment, the second print simulation filter includes a Gaussian unsharp filter.

In an advantageous embodiment, the step of generating a plurality of digital files, includes modifying a current one of said test digital files by changing one or more pixels from dark to light or light to dark to form a current one of said modified digital files.

In an advantageous embodiment, the method comprises modifying said digital file by changing one or more pixels from dark to light or light to dark is performed randomly.

In an advantageous embodiment, the modifying said digital file by changing one or more pixels from dark to light or light to dark is performed on a percentage of pixels relative to a total amount of pixels forming said CDP of not more than 10%, preferably not more than 5%, preferably between 0.5 and 2%.

In an advantageous embodiment, the generation of a plurality of digital files is iterative.

In an advantageous embodiment, the dark pixels are black pixels.

In an advantageous embodiment, the light pixels are white pixels.

In an advantageous embodiment, the at least partially random two dimensional (2D) distribution of dark and light pixels are generated using a cryptographic key.

In an advantageous embodiment, the cryptographic key may be randomly generated.

In an advantageous embodiment, the method comprises generating a plurality of portions of a CDP, each using the method described above, and assembling said plurality of portions to form said CDP.

A termination condition may be when the score difference is higher than a preset value, or a certain number of iterations, or a rate of change of the detection performance is below a certain threshold, or after a set computation time.

Also disclosed herein, according to a preferred aspect of the invention, is a method of generating a copy detection pattern (CDP), or a portion of a CDP, for printing on a substrate, comprises:

a) generating a test digital file of an image comprising an at least partially random two dimensional (2D) distribution of dark and light pixels,
b) applying a first print simulation filter to said digital file configured to generate a first print image file simulating an original print of said image on a substrate,
c) applying a second print simulation filter to said first print image file to generate a second print image file simulating a printed copy of said original print,
d) computing a copy detection performance for said digital file indicative of a measure of the differences between the printed copy and the original print,
e) creating a modified digital file by modifying said test digital file by changing one or more pixels from dark to light or light to dark,
f) applying steps b) to d) on the modified digital file,
g) comparing the copy detection performance of the test digital file with the copy detection performance of the modified digital file,
h) if the copy detection performance of the modified digital file is indicative of a greater difference between the printed copy and the original print than the copy detection performance of the test digital file, replacing the test digital file with the modified digital file, which now becomes the test digital file,
i) if the copy detection performance of the modified digital file is indicative of a smaller difference between the printed copy and the original print than the copy detection performance of the digital file, repeating steps e) to h),
j) repeating steps b) to i) until a termination condition is met, and
k) after step j), forming said CDP or said portion of CDP, from the test digital file.

The above preferred aspect may further comprise additional features of the advantageous embodiments mentioned above.

In an advantageous embodiment, said second print simulation filter is identical to said first print simulation filter.

In an advantageous embodiment, said second print simulation filter is different from said first print simulation filter.

In an advantageous embodiment, said second print simulation filter includes a Gaussian unsharp filter.

In an advantageous embodiment, the step of computing a copy detection performance includes computing a score for each of the first and second print image files representative of a difference between the digital file and each of said first and second print image files.

In an advantageous embodiment, the step of computing the score comprises measuring a Pearson correlation coefficient.

In an advantageous embodiment, said first print simulation filter is a gaussian filter.

In an advantageous embodiment, the step of modifying said digital file by changing one or more pixels from dark to light or light to dark is performed on a percentage of pixels relative to a total amount of pixels forming said CDP or said portion of CDP of not more than 10%, preferably not more than 5%.

In an advantageous embodiment, the step of modifying said digital file by changing one or more pixels from dark to light or light to dark is performed on a percentage of pixels relative to a total amount of pixels forming said CDP or said portion of CDP between 0,2% and 2%.

In an advantageous embodiment, said percentage of pixels relative to a total amount of pixels forming said CDP or said portion of CDP is decreased for later iterations.

In an advantageous embodiment, the dark pixels are black pixels and/or the light pixels are white pixels.

In an advantageous embodiment, said at least partially random two dimensional (2D) distribution of dark and light pixels are generated using a cryptographic key, and optionally the cryptographic key is randomly generated.

Also disclosed herein is a method of generating a copy detection pattern (CDP), comprising generating a plurality of portions of a CDP, each using the method according to any preceding aspect or embodiment, and assembling said plurality of portions to form said CDP.

Embodiments of the invention also include a CDP generated according to any of the above methods and a product bearing a printed CDP generated according to any of the above methods.

In an advantageous embodiment, the first and said second print simulation filters may be neural networks.

Conventional CDPs are randomly generated, often pseudo-randomly from a cryptographic key which is itself randomly generated. The inventor has realized however that not are all secure graphics generated randomly have an essentially equivalent capability in separating originals from copies, but that some CDPs may be more effective than others.

The inventor has in particular observed that when printing a binary CDP, there are regions that tend to become mostly black and regions that tend to become mostly white. FIG. 1 contains a 50×50 pixels digital CDP and the scan of a 600 ppi print of that CDP (scanned at high resolution). Area 1 shows one of many areas that become mostly black after printing, while zone 2 shows an area which becomes mostly white. As can be observed in the digital CDP, the density of black pixels is a bit higher than average in zone 1, while the density of white pixels is a bit higher than usual in zone 2. Of course, the local density of black versus white pixels varies naturally for CDPs with pixels that are determined pseudo-randomly with a certain distribution.

Regions which become mostly black or mostly white have actually lost their capacity to discriminate between originals and copies, as they will most likely no longer be modified when producing the copy: a white region in the original print will remain white, and a black region will remain black. On the other hand, transition regions from black to white (or vice versa), and regions where there is a balance of black and white pixels in the original prints, typically have more chances to get altered during the copying process. Therefore it is preferable to generate CDPs such that original prints of these CDPs have as many transition regions as possible.

Another observation from the inventor is that the loss of information through printing is only partially due to random effects, and the more significant effect appears to be a deterministic transformation of the CDP. This transformation does not vary significantly for two prints of the same CDP, as can be seen on FIG. 2 which shows two scans of two different printed CDPs of the same digital CDP (which was printed at 812 ppi on a HP Indigo printer). It can be observed that the two images are nearly similar. For illustrative purposes, one of the small differences is indicated, but it basically highlights that the two prints are essentially the same. The key takeaway is that making the assumption that CDPs are secure against copy on the premise that printing is a noisy process is not exactly true, as the print transformation is mostly deterministic. Indeed, printing an original CDP, or printing a copy from a scan of an original CDP, is more akin to a deterministic transformation than to the noise insertion of noise. Consequently, using a printing model where printing is described as a noise process, as has been done in the prior art, will lead to misleading conclusions on how CDPs should be designed to be optimally robust against copy.

One feature of this invention is to use mathematical models of the printing process and of the copying process, to search for optimized CDP structures in the CDP generation process. The process of finding an optimized CDP is initialized with a non-optimized CDP, which will be then optimized using methods described below. Based on the observations and discussion above, examples of the modelling of the detection performance, generation, printing, and copying according to embodiments of the invention are described below.

BRIEF DESCRIPTION OF THE DRAWINGS

FIG. 1 illustrates a 50×50 pixels digital CDP and a scan of a 600 ppi print of that CDP (scanned at high resolution);

FIG. 2 shows two scans of two different printed CDPs of the same digital CDP;

FIG. 3a shows an example of a digital CDP which is a 50×50 pixels large;

FIG. 3b shows the result of applying a Gaussian filter (with σ=1) to the digital CDP of FIG. 3a;

FIG. 3c shows a simulated optimized copy of the printed CDP of FIG. 3a;

FIG. 3d shows a simulated normal copy of the printed CDP of FIG. 3a;

FIG. 4 illustrates different example algorithms, in python language, to simulate printing, as well as to simulate the copying process;

FIG. 4a illustrates an example algorithm to generate an optimal CDP;

FIG. 4b illustrates an example algorithm to simulate generation of a large number of original CDPs, copied CDPs, and measure the score difference that can be obtained;

FIG. 4c illustrates an example algorithm to find optimal parameters of the unsharp filter used by the counterfeiter to prepare the copy;

FIG. 7 shows a tiled optimized digital CDP, and the original prints and copies;

FIG. 9 illustrates another example algorithm to optimize a CDP;

FIG. 10 shows an example of an initial digital image of a CDP (top), and of an optimized modified digital image of a CDP (bottom) obtained after 20,000 iterations using a method according to an embodiment of the invention;

FIG. 12 illustrates an example of lookup table which allows to determine, for a real printer, the corresponding σp (sigma) value of the Gaussian filter which allows to simulate the printing of an original CDP; this sigma value corresponds to a given average score, or Pearson correlation coefficient, on a set of scans of printed original CDP with this printer.

DETAILED DESCRIPTION OF EMBODIMENTS

Detection Performance

Given two images of identical size represented by n pixel values with $x_i$ and $y_i$ being the individual pixel values points indexed with i for each respective image, $r_{xy}$ is the Pearson correlation coefficient which has a value between −1 and +1:

$$r_{xy} = \frac{n\sum x_i y_i - \sum x_i \sum y_i}{\sqrt{n\sum x_i^2 - (\sum x_i)^2} \sqrt{n\sum y_i^2 - (\sum y_i)^2}}.$$

To assess detection performance, one can measure the Pearson correlation coefficient between the original and digital CDP, and between the copied CDP and digital CDP, to thus obtain an original score and a copy score. The score difference between the original score and the copy score may be used as a detection performance indicator: the larger it is, the better the CDP will potentially be at discerning originals from copies.

Figure 11A:
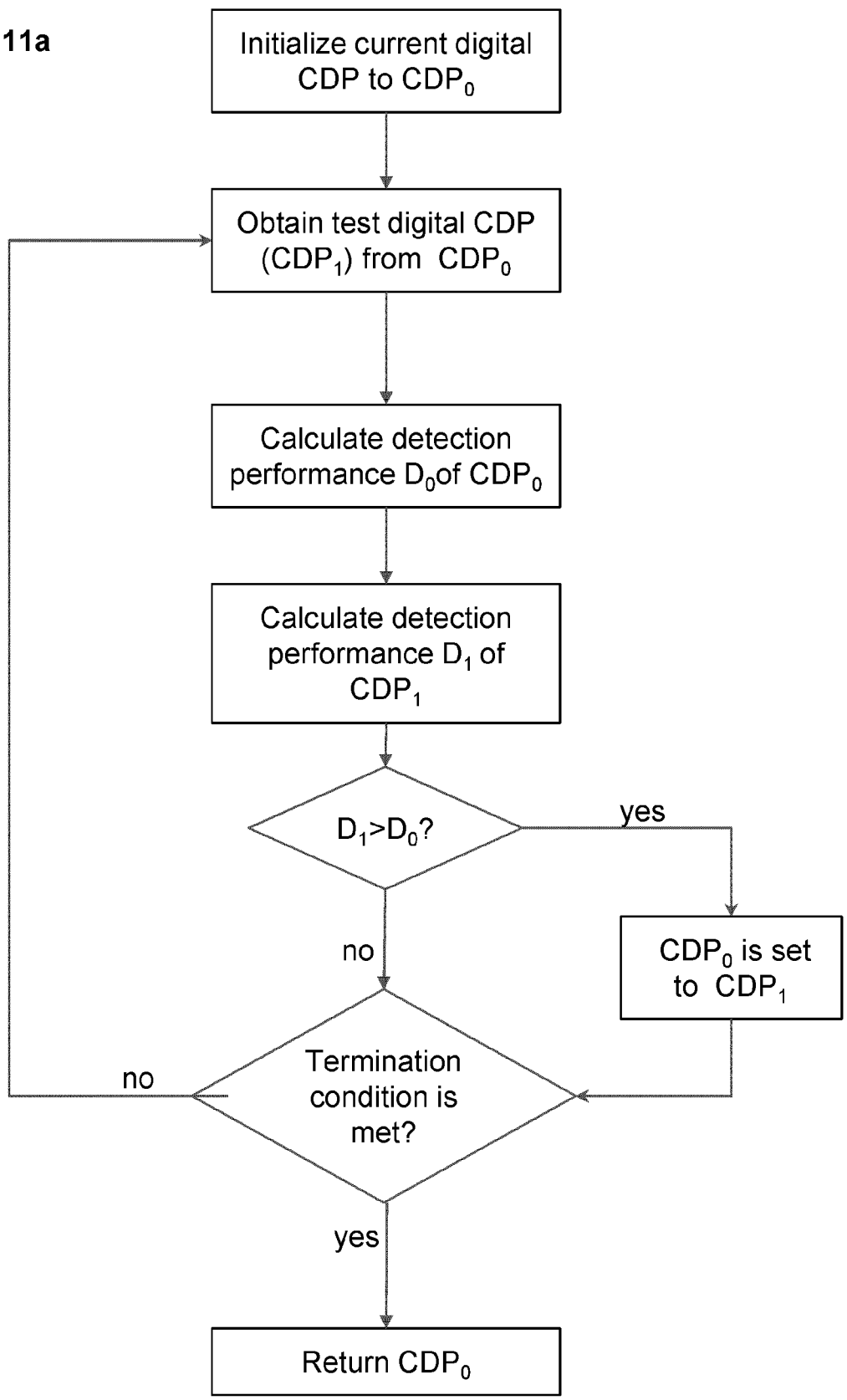
FIG. 11a illustrates a simplified flowchart of a method of generating a copy detection pattern according to an embodiment of the invention.
Figure 11B:
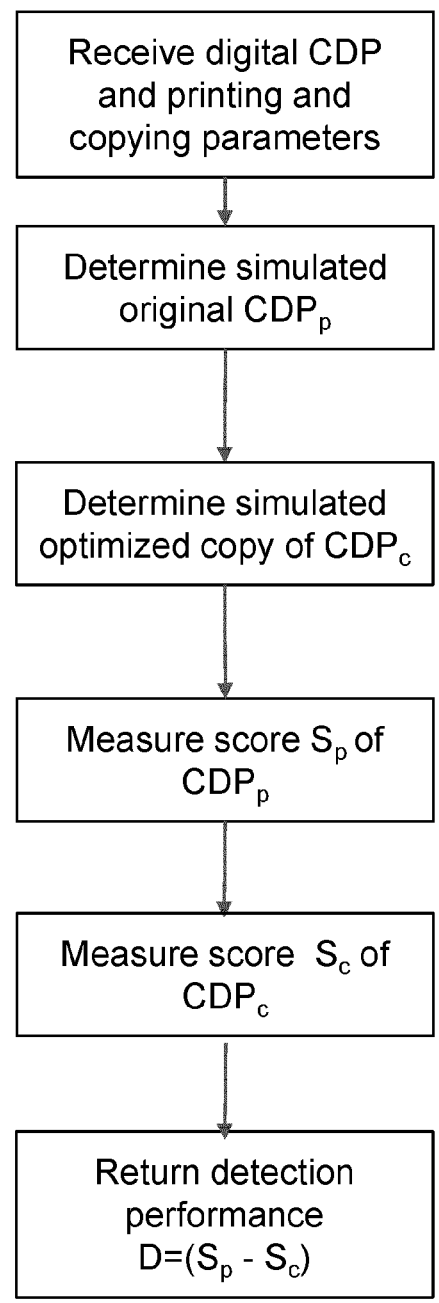
FIG. 11b illustrates a simplified flowchart of how detection performance is computed according to an embodiment of the invention.

FIG. 11b illustrates how detection performance is calculated with a flowchart.

There are several methods of determining the score according to embodiments of the invention. One comprises measuring the bit error rate (BER) between the test CDP and the digital CDP. To determine the BER, the test CDP, which is typical a grayscale image with integer values between 0 and 255, may be binarized using a threshold. There are multiple thresholding methods. Otsu's method is frequently used; another method comprises trying all integer threshold values and calculating the BER for each, then the smallest value found for the BER is returned.

It is also noted that multiple types of copies can be generated, using different algorithms, and the detection performance is calculated based on a combination of the individual scores for the different copies: for example the average, the maximum, or the median score of these different copies.

When the images are actual scans, a step of image registration should be done first, in which the scan is spatially transformed to align with the target image, which is the digital CDP. The transformation is required to achieve correspondence between the pixels values of the (transformed) scanned image and the digital CDP. However, this step is generally not needed when working with simulated originals and copies.

CDP Generation

One can generate pseudo-randomly an initial binary SG with 50% black pixel probability. FIG. 3 (a) shows one example digital CDP which is 50×50 pixels large.

Other percentage values may be used, as well as different types of structures: for example 2×2, 3×3, 4×4 or larger structures can be used if the print resolution is higher than 600 ppi. Asymmetric structures (e.g. 2×3 pixels) may also be used.

It is also possible to start with a non-random digital CDP, such as a grid with evenly spaced black pixel structures.

CDP Printing Model

One may simulate the printing process in a deterministic way by using a Gaussian blur filter. Optionally, the filtering can be followed by thresholding.

Below is an example Gaussian filter kernel (with the standard deviation parameter σ=0.84089642), taken from the Wikipedia page on en.wikipedia.org/wiki/Gaussian_blur. The center element (at [4, 4]) has the largest value, decreasing symmetrically as distance from the center increases.

[0.00000067  0.00002292  0.00019117  0.00038771
 0.00019117  0.00002292  0.00000067  0.00002292
 0.00078633  0.00655965  0.01330373  0.00655965
 0.00078633  0.00002292  0.00019117  0.00655965
 0.05472157  0.11098164  0.05472157  0.00655965
 0.00019117  0.00038771  0.01330373  0.11098164
 0.22508352  0.11098164  0.01330373  0.00038771
 0.00019117  0.00655965  0.05472157  0.11098164
 0.05472157  0.00655965  0.00019117  0.00002292
 0.00078633  0.00655965  0.01330373  0.00655965
 0.00078633  0.00002292  0.00000067  0.00002292
 0.00019117  0.00038771  0.00019117  0.00002292
 0.00000067]

FIG. 3b shows the result of applying such a Gaussian filter (with σ=1) to the digital CDP of FIG. 3a.

Other more complex functions, for example a neural network trained with various scans, may be used to simulate the scanning model.

CDP Scanning Model

Optionally, it may be advantageous to simulate imperfect scanning conditions for detection. In this case, the simulated original CDPs and simulated copies may be transformed by a model of the scanning process, which can be described as well with a Gaussian blur filter.

Other more complex functions, for example a neural network trained with various scans, may be used to simulate the scanning model.

Copying Process

Photocopies, and even copies made from a high-resolution scan and using the same printer are generally easy to detect with CDPs, as long as the counterfeiter applies only basic image processing before printing the scan to obtain the copies. One of the problems addressed by the present invention is the detection of superior copies where the counterfeiter processes the scan in a specific, optimized way before printing the copy. Such copies can for example be made by applying high-pass filters with well-tuned parameters, in order to pre-compensate the dot gain which occurs during printing of the copy. It may be done as well using deep learning-based approaches to achieve a similar purpose. Even if there are still some statistically significant differences between original CDPs and these optimized copies of CDPs, it may become difficult to discern originals from these optimized copies with 100% accuracy after taking into account the natural printing and scanning variations which occur in real-world applications.

In the simulations, we may assume the following steps for simulating a normal copy, respectively an optimized copy. The optimized copy differs from the normal copy only in step 1 below:

1. Perfect scan of original CDP: there is no information loss or transformation of the original CDP
2. For each type of copy:
   a. Normal copy: No image processing
   b. Optimized copy: Application of a Gaussian unsharp mask filter with near optimal values for optimized copies (more on this below)

3. Image binarization using the image mean as threshold
4. Print copy in the same condition as the originals, which means using the same value of σ in the Gaussian blur filter; alternatively, we may use a smaller or a larger σ for the copy, to simulate conditions where the copy is printed in better, respectively worst conditions than the originals.

It is known that a Gaussian unsharp mask is an image sharpening technique, which uses a blurred, or "unsharp", negative image to create a mask of the original image. The unsharp mask is then combined with the original positive image, creating an image that is less blurry than the original. The typical blending formula for unsharp masking is Sharpened image=original+(original image−blurred image)×Amount.

When using a Gaussian filter to determine the blurred image, the value of σ needs to be set, in addition to the value of the parameter "Amount" in the formula above. This value is different from the σ value used to simulate printing. In the following we will denote the parameter $\sigma_p$ as the parameter used to simulate the printer, and the parameter $\sigma_c$ as the value used in the unsharp filter by the counterfeiter.

For a given $\sigma_p$, the counterfeiter can determine by a grid search the values of $\sigma_c$ and Amount which seek to minimize the detection performance (the difference between original and copy score).

It is noted that several other copying models can be used. In particular, copies based on neural networks, also called deep learning may be used. Two such examples of copying models can be found in previously mentioned paper R. Yadav, I. Tkachenko, A. Trémeau, and T. Fournel, "*Copy Sensitive Graphical Code Estimation: Physical vs Numerical Resolution,*" in IEEE Workshop on Information Forensics and Security, Delft, Netherlands, December 2019 and: O. Taran, S. Bonev, T. Holotyak, and S. Voloshynovskiy, "*Adversarial detection of counterfeited printable graphical codes: towards "adversarial games" in physical world,*" in Proc. IEEE International Conference on Acoustics, Speech and Signal Processing (ICASSP), 2020.

In the following example, the print is simulated by a Gaussian filter with $\sigma_p$=1. FIG. 3 shows the digital CDP (in (a)), simulated printed CDP (in (b)), and simulated copies (optimized copy in (c) and normal copy (d)). The original score is 0.5634, while the normal copy score is 0.3820. There is a score difference of 0.1814, which in practice gives a comfortable margin to discern the original from the copy. For the optimized copy, the counterfeiter applies an unsharp filter. The optimal parameters after a grid search are $\sigma_c$=0.543 and amount=43, for a copy score is 0.5092. The score difference is 0.0542 which is considerably smaller. It can be appreciated from FIG. 3c that this optimized copy of CDP is visually much more similar to the original CDP, than is the normal copy of FIG. 3d. An example algorithm is given in FIG. 4c to determine values optimal parameter values.

If one repeats this simulation one thousand times with differently randomly generated CDPs, one will statistically get a similar result: the average score is 0.572 for the original CDP, 0.385 for the normal copy, and 0.507 for the optimized copy. The average score difference is 0.065, and the minimum and maximum score difference over the one thousand simulations are respectively 0.047 and 0.080. While there are some variations in the score difference, the best digital CDP (in the sense of leading to the largest score difference) generated randomly seems only slightly better than the worst CDP.

In practice, considering the natural variability due to print quality variations as well as scan quality variations, this gap may be too small to discern original from copies with a sufficiently high reliability.

It may be noted that similar results are found for different variations of the models that simulate printing (for example by thresholding after applying the Gaussian low pass filter, in the printing model) as well as for the copying process.

Example of an algorithm to determine an optimized CDP according to an embodiment The aim is to determine whether there are certain CDPs which would be naturally more robust to copying than others. For such "optimized CDPs", the score difference with good copies should be larger than the largest score difference that we found, which was 0.080. As we observed from the above example simulation repeated 1000 times, such CDPs, if they exist, are unlikely to be found by chance. Example code to make such simulation is shown in FIG. 4b.

The following iterative algorithm is an example of an embodiment, which at each iteration tests small modifications of a CDP, and keeps the modifications only if they lead to an "improved CDP" with a higher score difference. At each iteration, a random modification of a few pixels is made on the current digital CDP (flipping white pixels to back or vice-versa), to obtain a test digital CDP. Using the simulations described above to obtain an original CDP and a good copy CDP, the score difference may be computed for both the current CDP and the test CDP. If the score difference is higher for the test CDP, the current CDP becomes the test CDP for the next iteration, otherwise the current CDP remains the same. The algorithm terminates either after a certain number of iterations, when the score difference is higher than a preset value, or when it is unlikely that the test CDP will yield a higher score difference. Other termination conditions may be set (e.g. time, thresholds, etc).

The algorithm receives as input the printing model parameter $\sigma_p$, and the copying model parameters $\sigma_c$ and Amount. Note that the copying model parameters may not be necessary if some fixed values are used to generate the copy.

Here is the generic algorithm, described as a flowchart in FIG. 11:
Receive printing and copying parameters.
Initialize the current digital CDP by generating an initial digital CDP.
Iterate until termination conditions are met:
  Randomly flip a given percentage of pixels of current digital CDP, to obtain a test digital CDP.
  Calculate detection performance of current (i.e. modified) digital CDP as in FIG. 11b.
  Calculate detection performance of test digital CDP as in FIG. 11b.
  If detection performance of test digital CDP is superior to detection performance of current digital CDP, replace current digital CDP with test digital CDP.

One implementation of this iterative algorithm in python code is provided as an example in FIG. 4. In this example algorithm, a 50×50 pixels CDP initially generated from a binary equiprobable distribution, is iteratively modified randomly. The algorithm runs over 10,000 iterations (termination condition), using a 0.2% probability that each pixel of the digital CDP gets flipped at each iteration (on average, 5 pixels are flipped per iteration). The printing model uses a Gaussian blur with a σ of 1. The copying process model uses values previously mentioned of $\sigma_c$=0.543 and Amount=43.

Figure 5:
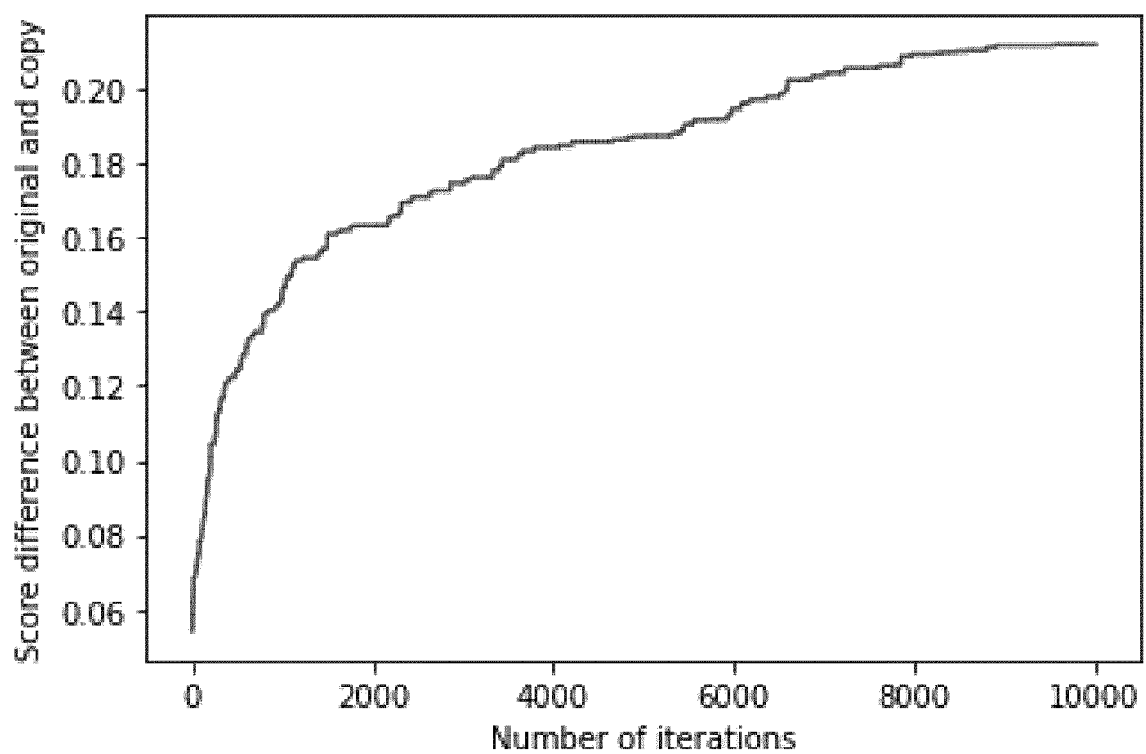
FIG. 5 shows a plot of the evolution of score difference when applying the algorithms of FIG. 4 to a previously generated CDP.

FIG. 5 shows the evolution of score difference when applying this algorithm to the previously generated CDP. The score difference starts at 0.0542, and increases four times to 0.223 at the 10,000th iteration. For the optimized CDP, the original score is 0.588 and the good copy score is 0.365. According to the simulation, the score difference between an optimized CDP and its optimized copy can be even larger than the score difference between a regular CDP and its optimized copy (which was of 0.1814 in the example above).

Figure 6:
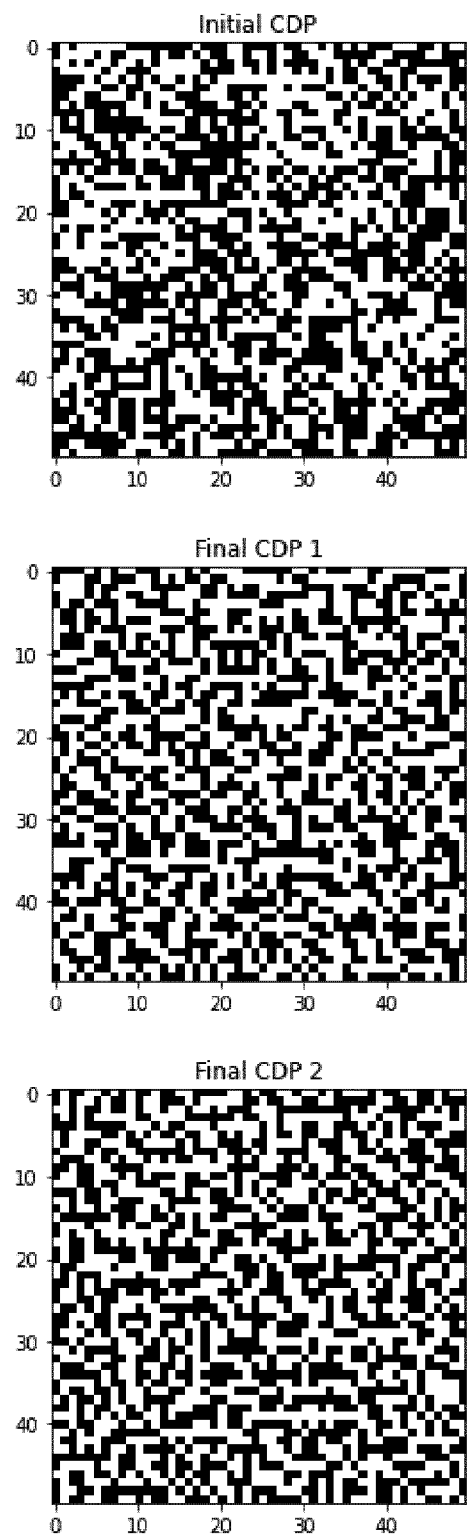
FIG. 6 shows an initial CDP, and two optimized CDPs obtained by a process according to an embodiment of the invention.

It is interesting to note that running this process multiple times from the same initial CDP, we typically obtain very different optimized CDPs: on average 43% of the pixel values differ. This suggests there is a potentially very large number of optimized CDPs. However optimized CDPs are extremely unlikely to be obtained by chance using a conventional CDP generation algorithm of the prior art. FIG. 6 shows the initial CDP, and two optimized CDP obtained by the process described above. What is visually striking in these two optimized CDPs is that, contrary to the initial CDP, there are no regions where black pixels or large pixels predominate. Such regions are much more frequent in the initial CDP.

A probability of bit flipping of 0.2% may seem too small. However, if a probability of 1% was used instead, the score difference after 10,000 iterations would only be of 0.155, as with this percentage it quickly becomes very unlikely to obtain random modifications that improve the score difference. For converging to an optimized CDP in a more efficient manner, the bit flipping probability may be set to a relatively high value initially, e.g. 1%, and then slowly decrease with the number of iterations.

Other termination conditions can be used, for example a certain detection performance, or a certain total number of modifications to the initial CDP.

Testing Method with Real Data

While this algorithm appears very promising when applied to synthetically generated originals and copies, it is useful to verify its effectiveness when confronted to real printing conditions. For this purpose, we have printed both the initial and optimized CDP 100 times, by tiling the same CDP 100 times. Both the 100 initial and optimized CDPs were copied in the same condition (using a 2400 dpi scan, followed by application of the unsharp filter (same parameters as before), thresholding and printing on the same printer). FIG. 7 shows the tiled optimized digital CDP, and the original print and copy. The scans of the original and copy are made at 1200 dpi. All scans are made using a Canon Canoscan 9000F, and the prints are made using a Canon IR-ADV C5535i laser printer.

For the initial CDP, the score of original CDPs is on average 0.4679. The score of copied CDPs is on average 0.3609, and the score difference is 0.1068.

Figure 8A:
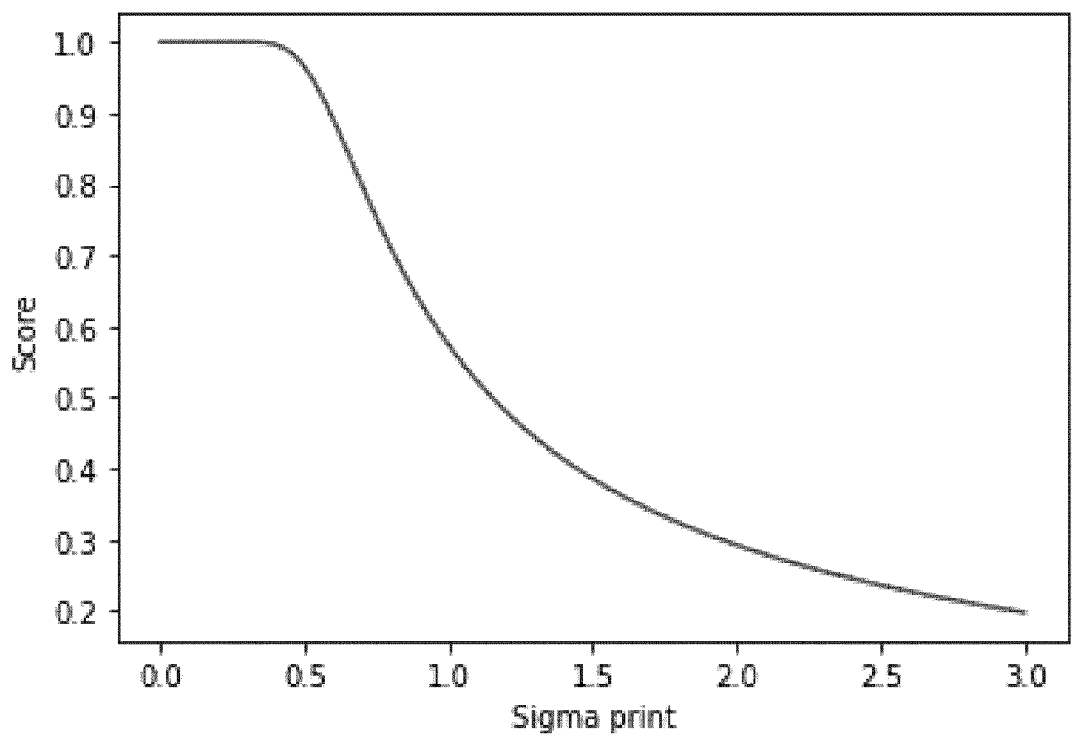
FIG. 8a shows a plot of the Pearson correlation coefficient versus the σp (sigma print) of the Gaussian blur filter used to simulate printing of the original CDP.
Figure 8B:
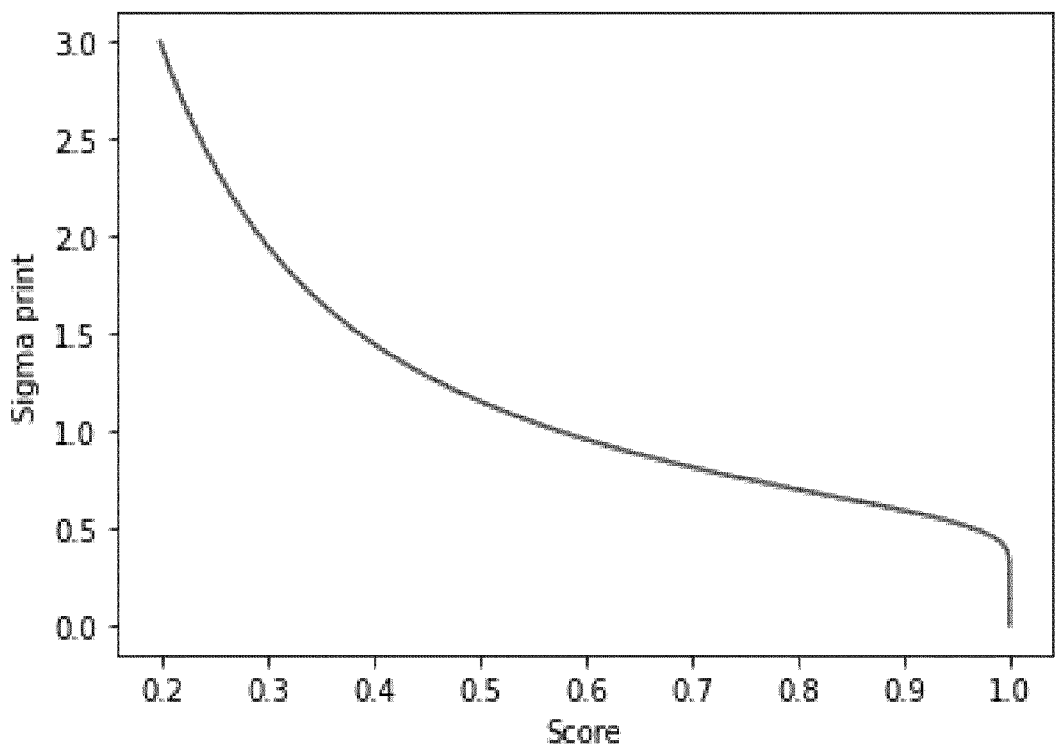
FIG. 8b shows a plot of the σp (sigma print) value corresponding to a given correlation coefficient, as calculated by interpolation.

To calculate an optimized CDP using the previously described algorithm, we need to determine the value of $\sigma_p$ for the Gaussian low pass filter, which gives a score (correlation coefficient) close to what we obtained for the original CDPs, i.e. 0.4679. To be able to determine the $\sigma_p$ value representative of different printers, we have generated a CDP, applied the Gaussian low pass filter with multiple values for $\sigma_p$ between 0 and 3. FIG. 8a shows the correlation coefficient versus $\sigma_p$. By interpolation, we are then able to determine the σp sigma value corresponding to a given correlation coefficient, as shown in FIG. 8b. A cubic spline interpolation using Python package SciPy can be used for instance, among many other possibilities, to do the interpolation. In this particular case, we find this value to be approximately 1.24.

We note that in practice, well known methods such as a lookup table or various interpolation functions can be used. A lookup table is provided in FIG. 12 for correlation coefficient of 0.25 to 0.7. This range of correlation coefficient is representative of printers that are used in practical applications. It is noted that it is not necessary to have a very precise value, as the algorithm will lead to a CDP with improved performance for a range of values, but it is preferable to be within the range that is representative of the printer.

For an optimized CDP in this example, the score of original CDPs is on average 0.4717, the score of copied CDPs is on average 0.2604, and the score difference is 0.1905. While the score difference is not quite as large as with synthetically generated prints and copies, the improvement in differentiation between original and copies remains very significant. This demonstrates that the optimization process of CDPs significantly increases their ability to detect copies. While in this experiment in a benchmarked environment, copies are fully separated from originals for the initial CDP as well, a larger score difference is very important to ensure higher robustness in real world scenarios, where there can be larger score variations due to evolving print conditions, as well as a larger variety of scan quality.

Algorithm for Determining Printing Parameters

The previous algorithm requires a printing parameter $\sigma_p$ as input. Here is an example of an algorithm to evaluate this value according to an embodiment:

1. Generate one or a set of digital CDPs (e.g. binary CDP with 50% black pixel probability).
2. Print CDPs on the printer of interest, to obtain set of printed CDPs.
3. Scan printed CDPs to obtain a set of scanned CDPs.
4. Measure score or each scanned CDP (e.g. correlation coefficient after image alignment with the source CDP) and determine average score.
5. Determine sigma parameter for average score, using the lookup table in FIG. 12. The closest value to the average score in column "score" is used to determine the $\sigma_p$ printing parameter value in column "sigma".

Alternative Method to Determine Optimized CDP

The process above is relatively computationally intensive, as it does require a number of iterations to converge to an optimized CDP. However its speed can be improved by orders of magnitude in different ways. One very effective way comprises creating, in advance, several small optimized CDPs, using the process described above. For example, ten thousand optimized CDPs of size 10×10 pixels can be created in advance. Then, when generating a new CDP, for example of 50×50 pixels, for each of the twenty-five 10×10 blocks of the CDP, one of the ten thousand 10×10 structures will be pseudo-randomly selected. Once assembled, this CDP can be further optimized through a smaller number of iterations (e.g. 500), as this will help to eliminate possible suboptimal regions at the transition between blocks.

Other algorithms within the scope of the invention can be used to achieve a similar result at a lower computational cost, while preserving the spirit of the method. One such method comprises reducing the number of regions where there is a high proportion of black pixels or a high proportion of white pixels. This can be done by randomly picking regions of, say, 3×3 pixels, and setting the central pixel to white, respectively black, if more than half the pixels around it are black, respectively white. One example algorithm is given in FIG. 9. This algorithm can be initialized with img0 being a random binary matrix with approximately 50% black pixel and the number of iterations nb_iterations=20000. FIG. 10 shows an example with an initial image (top), and an image obtained after twenty thousand iterations (bottom).

Until termination condition is met:
Select a random pixel in the CDP.
Calculate sum of black pixels in a region around this pixel.
If the pixel is white and the sum of black pixels is under a given threshold, set this pixel to white.
If the pixel is black and the sum of black pixels is over a certain threshold, set this pixel to white.

ADDITIONAL REMARKS

It may be noted that the method can work with any printing model. More sophisticated and accurate printing models, for example derived from using neural networks, can be used as well.

In practice, the optimized CDP may be then sent to the printer that will be used to print the original items. It may be printed once on a single item, or an arbitrary number of times on different items. This CDP, information allowing to reconstruct that CDP, or any transformation of that CDP may be stored on the authentication server. Reference scans of the printed CDP may be stored, instead or in addition, on the authentication server.

The invention claimed is:

1. A method of generating a copy detection pattern (CDP), or a portion of a CDP, for printing on a substrate, comprising:
generating a plurality of digital files, each of an image comprising an at least partially random two dimensional (2D) distribution of dark and light pixels, and
applying an optimization process configured to increase a copy detection performance of a resultant digital file output by the method, said optimization process comprising
a) comparing a copy detection performance of a first of said plurality of digital files, which constitutes a test digital file, with a copy detection performance of another of said plurality of digital files modified with respect to said test digital file, which constitutes a modified digital file,
b) replacing the test digital file with said modified digital file, if the copy detection performance of said modified digital file is greater than the copy detection performance of the test digital file, in which case the modified digital file becomes the test digital file, and
c) repeating steps a) and b) until a termination condition is met,
d) after step c), forming said CDP or said portion of CDP, from the test digital file, wherein said step of comparing a copy detection performance includes, for each of said test and modified digital files:
applying a first print simulation filter configured to generate a first print image file simulating an original print of said image on a substrate,
applying a second print simulation filter to said first print image file to generate a second print image file simulating a printed copy of said original print, and
computing a copy detection performance for the digital file indicative of a measure of the differences between the printed copy and the original print.

2. The method according to claim 1, wherein computing a copy detection performance includes computing a score for each of the first and second print image files representative of a difference between the digital file and each of said first and second print image files.

3. The method according to claim 1, wherein computing the score comprises measuring a Pearson correlation coefficient.

4. The method according to claim 1, wherein said first print simulation filter is a gaussian filter.

5. The method according to claim 1, wherein said second print simulation filter is identical to said first print simulation filter or is different from said first simulation filter.

6. The method according to claim 5, wherein said second print simulation filter includes a Gaussian unsharp filter.

7. The method according to claim 1, wherein the first and said second print simulation filters are neural networks.

8. The method according to claim 1, wherein said step of generating a plurality of digital files, includes modifying a current one of said test digital files by changing one or more pixels from dark to light or light to dark to form a current one of said modified digital files.

9. The method according to claim 8, wherein modifying said digital file by changing one or more pixels from dark to light or light to dark is performed randomly.

10. The method according to claim 8, wherein modifying said digital file by changing one or more pixels from dark to light or light to dark is performed on a percentage of pixels relative to a total amount of pixels forming said CDP of not more than 10%.

11. The method according to claim 10, wherein the generation of a plurality of digital files is iterative.

12. The method according to claim 1, wherein the dark pixels are black pixels and/or the light pixels are white pixels.

13. The method according to claim 1, wherein said at least partially random two dimensional (2D) distribution of dark and light pixels are generated using a cryptographic key, and optionally the cryptographic key is randomly generated.

14. A method of generating a copy detection pattern (CDP), comprising generating a plurality of portions of a CDP, each using the method according to claim 1, and assembling said plurality of portions to form said CDP.

15. A method of generating a copy detection pattern (CDP), or a portion of a CDP, for printing on a substrate, comprising:
a) generating a test digital file of an image comprising an at least partially random two dimensional (2D) distribution of dark and light pixels,
b) applying a first print simulation filter to said digital file configured to generate a first print image file simulating an original print of said image on a substrate,
c) applying a second print simulation filter to said first print image file to generate a second print image file simulating a printed copy of said original print,
d) computing a copy detection performance for said digital file indicative of a measure of the differences between the printed copy and the original print,
e) creating a modified digital file by modifying said test digital file by changing one or more pixels from dark to light or light to dark,
f) applying steps b) to d) on the modified digital file,
g) comparing the copy detection performance of the test digital file with the copy detection performance of the modified digital file,
h) if the copy detection performance of the modified digital file is indicative of a greater difference between the printed copy and the original print than the copy detection performance of the test digital file, replacing the test digital file with the modified digital file, which now becomes the test digital file, i) if the copy detection performance of the modified digital file is indicative of a smaller difference between the printed copy and the original print than the copy detection performance of the digital file, repeating steps e) to h), j) repeating steps b) to i) until a termination condition is met, k) after step j), forming said CDP or said portion of CDP, from the test digital file.

16. The method according to claim 15, wherein said second print simulation filter is identical to said first print simulation filter or is different from said first simulation filter.

17. The method according to claim 16, wherein said second print simulation filter includes a Gaussian unsharp filter.

18. The method according to claim 15, wherein said first print simulation filter is a gaussian filter.

19. The method according to claim 15, wherein the first and said second print simulation filters are neural networks.

20. The method according to claim 15, wherein computing a copy detection performance includes computing a score for each of the first and second print image files representative of a difference between the digital file and each of said first and second print image files.

21. The method according to claim 15, wherein computing the score comprises measuring a Pearson correlation coefficient.

22. The method according to claim 15, wherein modifying said digital file by changing one or more pixels from dark to light or light to dark is performed on a percentage of pixels relative to a total amount of pixels forming said CDP or said portion of CDP of not more than 10%.

23. The method according to claim 22, wherein said percentage of pixels relative to a total amount of pixels forming said CDP or said portion of CDP is decreased for later iterations.

24. The method according to claim 15, wherein modifying said digital file by changing one or more pixels from dark to light or light to dark is performed on a percentage of pixels relative to a total amount of pixels forming said CDP or said portion of CDP between 0.2% and 2%.

25. The method according to claim 15, wherein the dark pixels are black pixels and/or the light pixels are white pixels.

26. The method according to claim 15, wherein said at least partially random two dimensional (2D) distribution of dark and light pixels are generated using a cryptographic key, and optionally the cryptographic key is randomly generated.

27. A method of generating a copy detection pattern (CDP), comprising generating a plurality of portions of a CDP, each using the method according to claim 15, and assembling said plurality of portions to form said CDP.

* * * * *